(12) United States Patent  (10) Patent No.: US 7,606,671 B2
Walker  (45) Date of Patent: Oct. 20, 2009

(54) METHOD OF QUANTIFYING PAINT AND BODYWORK ON AUTOMOBILES AND OTHER PAINTED OBJECTS USING COATING THICKNESS GAUGES

(75) Inventor: Joseph J. Walker, St. Clair Shores, MI (US)

(73) Assignee: Elcometer, Inc., Rochester Hills, MI (US)

( * ) Notice: Subject to any disclaimer, the term of this patent is extended or adjusted under 35 U.S.C. 154(b) by 34 days.

(21) Appl. No.: 12/001,696

(22) Filed: Dec. 12, 2007

(65) Prior Publication Data

US 2009/0157349 A1    Jun. 18, 2009

(51) Int. Cl.
*G01B 3/44* (2006.01)
*G06K 9/00* (2006.01)

(52) U.S. Cl. .............................. 702/34; 382/141; 521/56

(58) Field of Classification Search ................... 702/32, 702/34, 35; 700/283; 356/73, 613; 382/141; 521/56
See application file for complete search history.

(56) References Cited

U.S. PATENT DOCUMENTS

| 5,208,766 | A  | * | 5/1993  | Chang et al. ................. 382/141 |
| 5,596,412 | A  | * | 1/1997  | Lex ............................. 356/613 |
| 6,816,756 | B2 | * | 11/2004 | Shin et al. .................... 700/283 |
| 7,298,462 | B2 | * | 11/2007 | Udo et al. ...................... 356/73 |
| 7,351,752 | B2 | * | 4/2008  | Miki et al. ..................... 521/56 |

* cited by examiner

*Primary Examiner*—John H Le
(74) *Attorney, Agent, or Firm*—Dykema Gossett PLLC

(57) ABSTRACT

A method is disclosed for a test and data retrieval method that not only provides an illustration of an object paint condition but also provides a linear numerical data point, that gives the user a quantifiable number to determine the extent of body work and over paint for a painted object that is being appraised, up for bid, or sold in a private treaty sale or auction.

18 Claims, 3 Drawing Sheets

METHOD OF QUANTIFYING PAINT AND BODYWORK ON AUTOMOBILES AND OTHER PAINTED OBJECTS USING COATING THICKNESS GAUGES

BACKGROUND OF THE INVENTION

Field of the Invention

A typical automobile body is comprises of a metal substrate with three layers of paint coatings over a single layer of a corrosion control coating. In the case of plastic substrates, the corrosion control coating may be absent. Automobile manufacturers, for reasons of quality control and cost, continually monitor the thickness of these coatings. Typically, the coatings are a corrosion control coat, a base coat, a color coat, and a clear coat. The thickness of each layer is critical to maintain budgets as well as to provide the specified corrosion, appearance, and bonding characteristics. As the process for the application of each coating varies from moment to moment, each vehicle has a unique coating "fingerprint". The "fingerprint" is comprised of chemical, appearance, and thickness characteristics of that vehicle. For example, if a vehicle comes off the line and there is a drip or sag in the coating, that vehicle may be either run through the line a second time or set aside in a re-work station for remedial action.

Over the service life of a vehicle, there are many factors that can influence not only the condition of paint coatings but also the appearance and corrosion resistance of these coatings. These factors range in severity from minor scratches in the clear coat (caused by car wash brushes) to major bodywork that requires body filler and after market paint. The only way to reliably verify over paint and bodywork is with the use of a coating thickness gauge which allows the user to check the suspect panel of the automobile against the unique paint thickness "fingerprint" of the other body panels to determine if the suspect panel(s) deviates from the average thickness of the other body panels. Body shops and OEM body shop specifications require that the paintwork should try to match the substrate shape and smoothness. The only requirement for paintwork is that the reworked panel(s) is a color match to the unaffected panels.

When a vehicle comes off lease, is repossessed, or is being sold by its current owner, a value must be established before resale. The leading sources to obtain a value are the US price guides such as NADA Price Guides, Kelly Blue Book and the Manheim Market Report. These guides take into account virtually every factor that can effect value (including tire wear, engine condition, frame damage, mileage, color, and condition). All of these factors are evaluated and discounted off of the "optimum value" to determine the "diminished value" of a given vehicle. In the case of paintwork, a visual evaluation is the only factor considered as to weather or not paintwork or previous paint work (PPW) is present. There is currently no linear scale available in which the severity of paintwork can be numerically evaluated and subsequently be compared against similar vehicles to determine the true diminished value due to paintwork severity. As a result, a vehicle with a cosmetically over painted door panel will have the same diminished value for paintwork as a vehicle riddled with Bondo and over paint due to repair after a severe crash.

Currently, the automotive remarketing industry has formulae in place to determine "diminished value" of a vehicle for every non-conformance with the exception of paintwork. (Web, Thomas. Chief Economist, Manheim Auctions. National Automotive Remarketing Conference. Dearborn, Mich. November 2005).

The used vehicle market in the United States of America is valued at over $375 billion dollars at the retail level. Total new and used vehicle sales reached a record 59.8 million units in 2001, reflecting a strong and highly efficient remarketing system to which the present invention is directed. The average price of a used car has risen from $6,140 in 1991 to $8,830 in 2001. In 2001 franchise and independent dealers acquired 21.8 million used car units in trade from customers who opted to acquire newer models. The total number of used vehicle units sold has grown steadily to over 40 million units in 2001 from 37 million units the previous year. It is expected that the number of used vehicles sold will increase approximately 600,000 units per year, with increase in total wholesale transactions. The international vehicle remarketing is in excess of 120 million units per year. The major players of the remarketing system worldwide include vehicle manufacturers, franchise and independent automobile dealers, wholesalers, fleet operators, rental car companies, leasing organizations, banks and financial institutions and auto reconditioning, appraising and titling organizations.

SUMMARY OF THE INVENTION

This invention relates to a linear and repeatable method of providing a numerical reference in which the extent and severity of paintwork on a used vehicle or other painted surface may be graded and compared against similar vehicles or painted objects to determine the impact the paintwork has on value.

Data collection points are determined for each body panel of a vehicle and paint thickness readings are taken at each data point using a paint or coating thickness gauge. Each point will indicate the paint thickness at that point. Inspectors will either store the thickness readings on a coating thickness gauge, store them manually, or have the readings input via Bluetooth® technology into a data collection device. The number of thickness readings taken and data points collected would vary according to the "optimum value" of the vehicle or the owner's specifications.

At the conclusion of the inspection, an inspector will evaluate the individual readings as well as note the Coefficient of Variation (COV) of those readings. The COV provides an indication as to the overall paint thickness variation of all data points collected. Therefore, a vehicle with numerous areas of Bondo and over paint will have high variation and, subsequently, a high COV. Vehicles with uniform paint thickness will have little variation and, subsequently will have a low COV.

Price guides will be able to collect COV paint readings for every vehicle inspected and use the COV to more accurately determine the diminished value of the vehicle due to paint and bodywork (or lack thereof) for every vehicle inspected. When enough data is collected, price guides and buyers will have a reliable standard upon which they can purchase a vehicle with confidence either in person or on the Internet.

In the case of vehicles being offered for sale via the Internet, paint data points can be overlaid onto a vehicle template and the user can not only accurately determine the severity of the repair but also the specific areas of the vehicle that have been repaired.

DETAILED DESCRIPTION OF THE PRESENT INVENTION

As mentioned previously, the automobile remarketing industries has formulae in place to determine "diminished value" of a vehicle for every non-conformance with the exception of paintwork. The present invention is directed to solving this "missing link" by creating new formulas which supplement the existing information required for a person or company to confidentially bid online regardless of where the vehicle is located. A bidder on line will click on the auction site, click on the appropriate windows showing the inside and outside views of the automobile to observe as well as to read the pertinent information on the condition of the vehicle. The Coefficient of Variation (COV) of the paint work of the used automobile will appear and can be factored and evaluated in determining the bid price for the vehicle.

Figure 1:
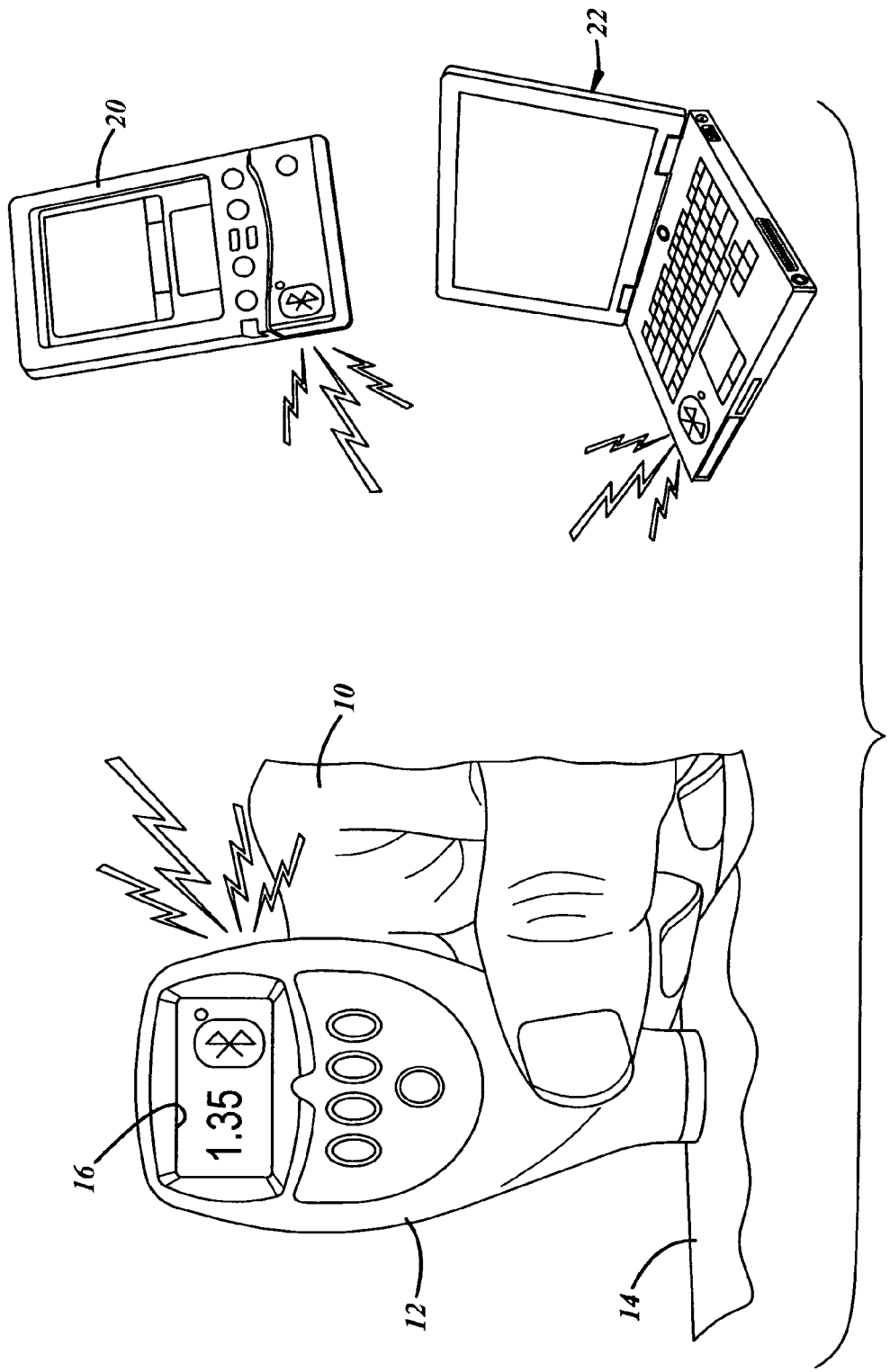
FIG. 1 is a pictorial view of a Bluetooth® enabled paint thickness gauge in contact with a vehicle panel for determining the paint thickness reading which is directed electronically to and stored in a PDA and/or a personal computer (PC).
Figure 2:
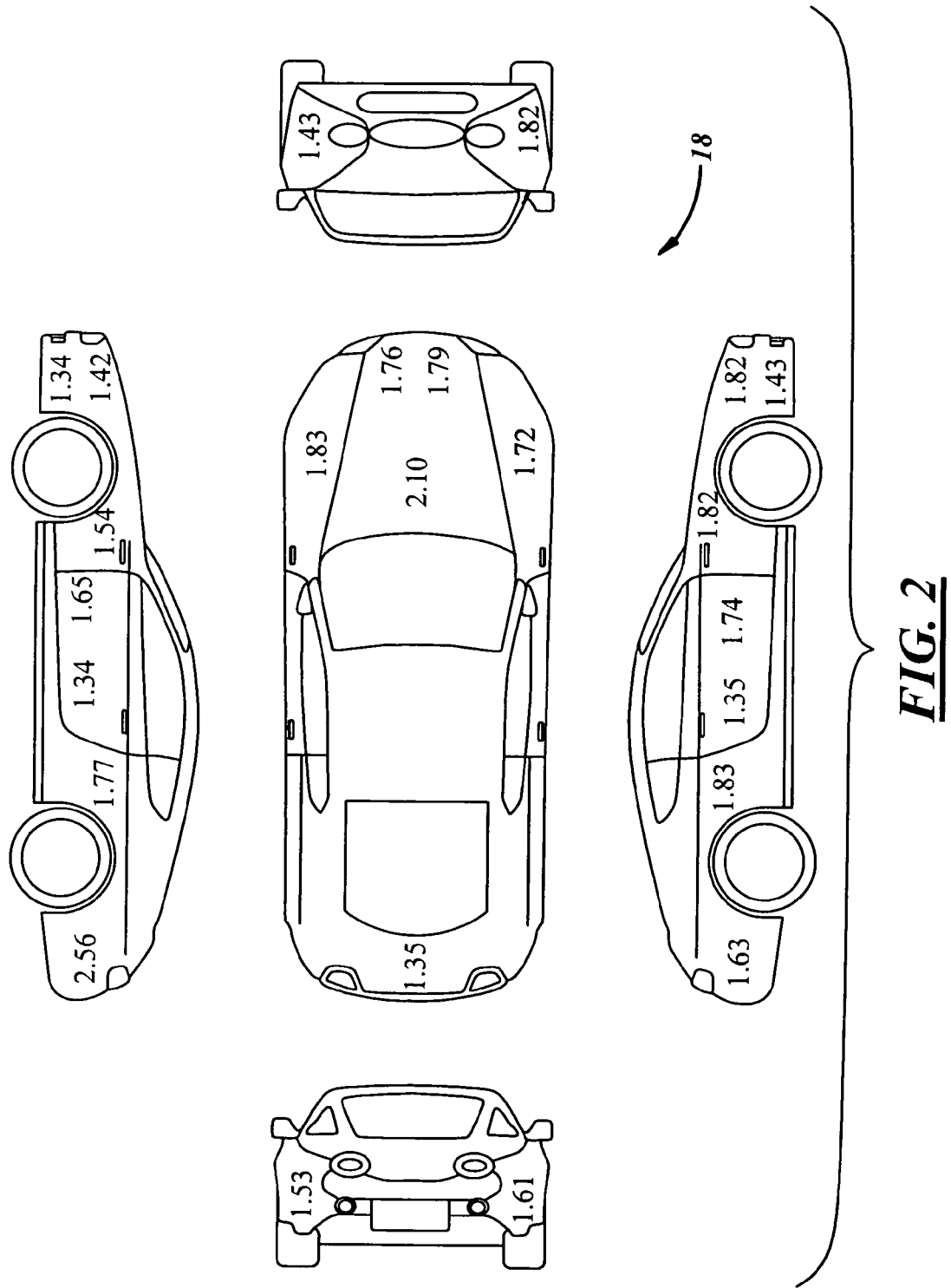
FIG. 2 is a template illustrating the top, front, sides and end views of an automobile showing the readings of the thickness gauge data points on various panels.

Referring now to FIG. 1, the hand 10 of an inspector is holding a paint thickness gauge 12 and has applied gauge 12 to the panel 14 of an automobile (not shown). One brand of a paint thickness gauge 12 which may be used is an Elcometer 456 paint thickness gauge to measure the paint or coating thickness on the vehicle. It is electronically operated and uses Bluetooth® wireless technology. In FIG. 1, the reading of the paint thickness at the data point on panel 14, shown in the window 16 of the gauge 12, is 1.35 mils. The readings of the data points collected may be stored manually on a chart, graph or on a vehicle template 18 over the panels which were measured as illustrated in FIG. 2. Primarily, each data point reading will be transmitted electronically, as an example, via Bluetooth® technology into a data collection device such as a Personal Digital Assistant (PDA) 20 and/or a personal computer (PC) 22.

Figure 3:
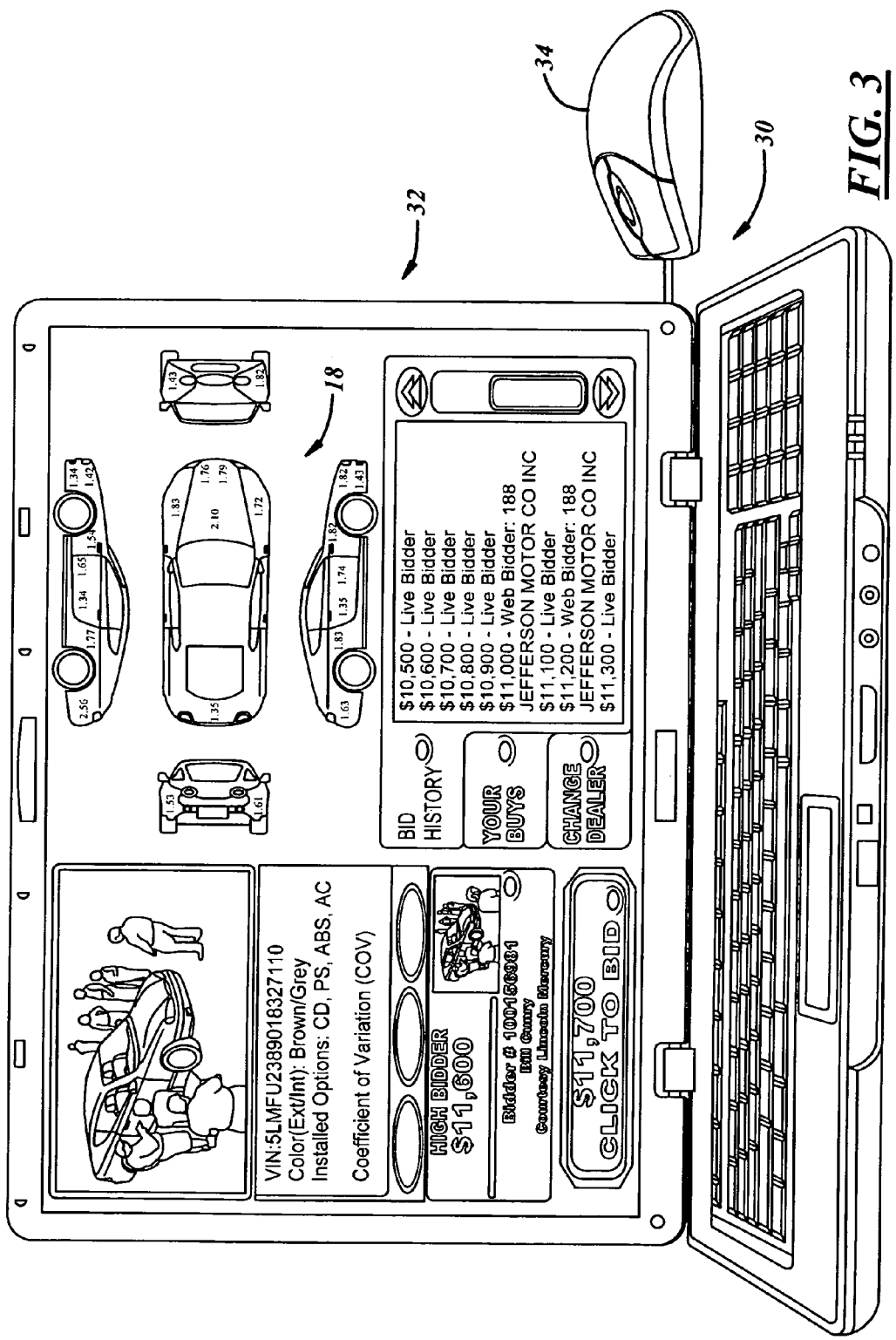
FIG. 3 is a view of a computer and screen illustrating the Coefficient of Variation (COV), template with data point readings and other information for assisting the bidder at a remote site on the internet for determining the diminished value and bid price of a used automobile available for resale.

It will be appreciated that the number of thickness readings taken and data points collected will vary according to the "optimum value" of the vehicle or owner's specifications. In the illustrations of FIGS. 2 and 3, twenty-four data points are illustrated on the panels where the readings were taken. Once the inspector has evaluated the individual readings the Coefficient of Variation (COV) is calculated.

In FIG. 2 the template 18 represents a Mercedes Benz, A class, 2-door. The readings in Mils are illustrated in the following chart:

| 2005 MB-A 2DR (mils) | |
|---|---|
| 1 | 1.34 |
| 2 | 1.42 |
| 3 | 1.54 |
| 4 | 1.65 |
| 5 | 1.34 |
| 6 | 1.77 |
| 7 | 2.56 |
| 8 | 1.83 |
| 9 | 1.75 |
| 10 | 1.79 |
| 11 | 2.10 |
| 12 | 1.72 |
| 13 | 1.35 |
| 14 | 1.43 |

-continued

| 2005 MB-A 2DR (mils) | |
|---|---|
| 15 | 1.82 |
| 16 | 1.92 |
| 17 | 1.74 |
| 18 | 1.39 |
| 19 | 1.88 |
| 20 | 1.63 |
| 21 | 1.82 |
| 22 | 1.43 |
| 23 | 1.59 |
| 24 | 1.81 |

Note:
1 mil = 0.001 inch

The first step is to add or total the readings 1-24 inclusive and then divide the total by the number of readings (24) to obtain the mean average of the readings. In the example, the twenty four readings total 40.62 mils and this number divided by twenty four equals 1.69 mils.

The second step is to utilize the mathematical process of iterating or repeating a function for each data point reading utilizing the formula $-(X_{1\text{-}24}-1.69)^2$ where X equals a data point reading minus the mean average reading of 1.69 and then the result within the parenthesis is squared.

A chart showing some of the iteration calculations for data points 1, 5, 10, 15 and 24 follows:

$$i = (X_1 - 1.69)^2 = (1.34 - 1.69)^2 = 0.124$$
$$i = (X_5 - 1.69)^2 = (1.34 - 1.69)^2 = 0.124$$
$$i = (X_{10} - 1.69)^2 = (1.79 - 1.69)^2 = 0.010$$
$$i = (X_{15} - 1.69)^2 = (1.82 - 1.69)^2 = 0.016$$
$$i = (X_{20} - 1.69)^2 = (1.63 - 1.69)^2 = 0.004$$
$$i = (X_{24} - 1.69)^2 = (1.81 - 1.69)^2 = 0.014$$

Iteration Values for Data Point Readings 1-24 are as follows:

| | $(X_i - 1.69)^2$ |
|---|---|
| 1 | 0.124 |
| 2 | 0.074 |
| 3 | 0.023 |
| 4 | 0.002 |
| 5 | 0.124 |
| 6 | 0.006 |
| 7 | 0.753 |
| 8 | 0.019 |
| 9 | 0.003 |
| 10 | 0.010 |
| 11 | 0.166 |
| 12 | 0.001 |
| 13 | 0.117 |
| 14 | 0.069 |
| 15 | 0.016 |
| 16 | 0.052 |
| 17 | 0.002 |
| 18 | 0.092 |
| 19 | 0.035 |
| 20 | 0.004 |
| 21 | 0.016 |
| 22 | 0.069 |
| 23 | 0.011 |
| 24 | 0.014 |

$$\sum_{i=1}^{24} (X_i - 1.69)^2 = 1.802$$

The third step is to add or total the iterations for data point readings 1-24 and to obtain the total of 1.802.

Once the numerical data point readings have been either manually recorded or electronically recorded in the PDA 20 and/or PC 22 it is then necessary to calculate the Coefficient of Variation (COV) when calculating the (COV), the following formulas are utilized:

$$S = \sqrt{\sum_{i=1}^{n} \frac{(x_i - \text{mean})^2}{(n-1)}}$$

and $$COV = \frac{S}{\text{mean}} \times 100$$

In the aforementioned formulas, i=the index of iteration starting at 1. The letter "n" equals a number of readings, in this example, 24 readings. The letter "X" equals the individual readings. Mean equals a mean average of readings. The representation "Σ" equals the summation and the sign $\sqrt{}$ equals square root. Finally the letter "S"=sum.

The fourth step is to use the formula:

$$S = \sqrt{\sum_{i=1}^{n} \frac{(x_i - \text{mean})^2}{(n-1)}}$$

$$= \sqrt{\frac{1.802}{23}} = 0.28$$

The numerator was previously calculated to be 1.802 and the denominator is equal to the total number of reading of 24 minus 1 or 23. The sum (S)=the square root of 1.802 divided by 23 which equals 0.28.

The fifth step is to determine the Coefficient of Variation (COV) utilizing the following formula:

$$COV = \frac{S}{\text{Mean}} \times 100$$

$$= \frac{0.28}{1.69} \times 100$$

$$= 16.6$$

Once the (COV) is calculated, it is entered into the official records of the vehicle which is offered for sale. It is entered on the screen (FIG. 3) and is available at the auction site where the car is located and is available online over the internet.

FIG. 3 illustrates a computer 30, a screen 32 and a mouse 34. The live screen 32 in the upper left hand corner thereof indicates various persons inspecting the vehicle for bidding purposes. The VIN number of the vehicle is shown as well as the color brown on the exterior of the vehicle and grey on the interior of the vehicle. Various installed options are indicated including a compact disc player (CD), power steering (PS), brakes (ABS) and air conditioning (AC). The screen illustrates the history of the bidding, the offers, whether by a live bidder or a web bidder. The computer mouse 32 is used by a web bidder to click on and place a bid.

A finance company, Bank of America, for example, repossesses a high brand 2005 Mercedes-Benz A Class two-door sedan in Daytona Beach, Fla. The vehicle has 27,000 miles, Brilliant Silver color, with a black leather interior. The vehicle is then shipped to the Manheim Orlando Auto Auction for inspection, detailing, and sale.

As the bank representative is California, USA based, an inspection by an on site auction representative or third party inspector is required to give a condition report so that the owner and the auction company may establish value and a minimum acceptable bid. If the vehicle is not accurately inspected, the minimum bid may be too high and will not be in line with the vehicles value and likely will not find a buyer. Therefore, the bank will have to carry the vehicle on its books until the next auction in which Mercedes buyers are likely to attend.

The auctioneer also has an incentive to sell the vehicle the first time through the sale as it also incurs the expense of storage and reoffering the vehicle at a later sale. It is important for both the auctioneer and the bank to accurately determine the market value of the vehicle as expenses incurred for both parties can quickly impact each party's profit or loss.

An inspector evaluates every aspect of the vehicles condition by following screen prompts of a data collection device and inputting the results. At some point, the device prompts the inspector to collect coating thickness data at various points around the vehicle. As this is an expensive vehicle, there are six data points collected on every panel. Each coating thickness readings is sent via Bluetooth® technology to the data collection device in which the reading is superimposed over the data point on the vehicle template.

At the conclusion of the inspection, the bank is sent a vehicle inspection report. Included in the report is the paint inspection report. In this case the COV is 240. As this reflects extremely high paint variation, the bank representative pulls up the vehicle template and notes that the variation is caused by abnormally high paint thickness readings on the hood, left quarter panel, and front left door. The template also shows that some areas of the front left quarter panel show ¼" (250 mils) of paint. This abnormally high thickness shows the presence of Bondo. The bank representative then checks sales results of other Mercedes A Class model vehicles with similar mileage and high COV values. From this data, it is determined that similar vehicles usually sell for 8% lower than like vehicles with a lower COV. Therefore, to ensure the likelihood of sale, the minimum sales price is lowered 8%.

When the vehicle is auctioned, there are bidders both on site and online competing. Traditionally, the bidders onsite have an advantage in the bidding because they are able to use a coating thickness gauge to determine the extent of the damage. Today, however, an online bidder is able to view the paint work template online and view the same information as those on site. Because the online bidder has more reliable information regarding what had previously been a "buyer beware" situation, he/she has the confidence to bid a higher amount for the vehicle and the chances that the minimum sales price or higher can be achieved are greatly increased.

I claim:

1. The method of determining the diminished value of a used automobile available for resale, with the automobile having panels with an exterior surface, comprising the steps of:

(a) utilizing a paint thickness gauge and determining the paint thickness at various data points on the exterior surface of the panels forming the top, sides, front, and rear of an automobile;

(b) storing the readings of the data points which have a coefficient of variation (COV) in a data collection device;

(c) calculating the coefficient of variation (COV) of the readings of the data points by using the formulas:

$$S = \sqrt{\sum_{i=1}^{n} \frac{(x_i - \text{mean})^2}{(n-1)}}$$

and $$COV = \frac{S}{\text{mean}} \times 100$$

where i=index of iteration starting at 1, n=number of readings, x=individual readings, mean=mean average of readings, Σ=summation, √=square root and S=sum;

(d) placing the individual readings of the data points onto a template of the automobile;

(e) assembling the coefficient of variation and automobile template with the data point readings along with other economic factors relating to the value of the automobile namely, tire wear, engine condition, frame damage, mileage, color and or other condition which can effect value of the automobile; and (f) viewing the automobile on or off-site to thereby evaluate the economic factors of the automobile thereby determining the diminished value of the used automobile.

2. The method of determining the diminished value of used automobiles available for resale as set forth in claim 1, wherein said paint thickness gauge is a wireless enabled paint thickness gauge; and
   the steps of storing the data point readings utilize wireless technology.

3. The method of determining the diminished value of used automobiles available for resale as set forth in claim 2, wherein the wireless enabled paint thickness gauge is Bluetooth enabled; and
   the step of storing the data point readings utilizes Bluetooth technology.

4. The method of determining the diminished value of used automobiles available for resale as set forth in claim 3, wherein the data collection device is a personal digital assistant (PDA).

5. The method of determining the diminished value of used automobiles available for resale as set forth in claim 3, wherein the data collection device is a personal computer (PC).

6. The method of determining the diminished value of used automobiles available for resale as set forth in claim 3, wherein the data collection device is a personal digital assistant and a personal computer (PC).

7. The method of determining the diminished value of used automobiles available for resale as set forth in claim 1, and the step of evaluating the individual data point readings and the coefficient of variation of the readings.

8. The method of determining the diminished value of used automobiles available for resale as set forth in claim 1, wherein said viewing takes place over the internet using a computer.

9. The method of determining the diminished value of used automobiles available for resale as set forth in claim 1, wherein the calculations are performed manually.

10. The method of determining the diminished value of used automobiles available for resale as set forth in claim 1, wherein the calculations are performed automatically using a computer software program.

11. The method of determining the diminished value of the exterior paint of a used automobile available for resale, with the automobile having panels with an exterior surface, comprising the steps of:
    (a) utilizing a paint thickness gauge and determining the paint thickness at various data points on the exterior surface of the panels forming the top, sides, front, and rear of an automobile;
    (b) storing the readings of the data points which have a coefficient of variation (COV) in a data collection device;
    (c) calculating the coefficient of variation (COV) of the readings of the data points by using the formulas:

$$S = \sqrt{\sum_{i=1}^{n} \frac{(x_i - \text{mean})^2}{(n-1)}}$$

and $$COV = \frac{S}{\text{mean}} \times 100$$

where i=index of iteration starting at 1, n=number of readings, x=individual readings, mean=mean average of readings, Σ=summation, √=square root and S=sum;
    placing the individual readings of the data points onto a template of the automobile;
    assembling the coefficient of variation and automobile template with the data point readings along with other economic factors relating to the value of the automobile; and
    viewing the automobile on or offsite to determine the value of the used automobile.

12. The method of determining the diminished value of the exterior paint of a used automobile available for resale as set forth in claim 11, wherein said paint thickness gauge is a wireless enabled paint thickness gauge; and
    the steps of storing the data point readings utilize wireless technology.

13. The method of determining the diminished value of the exterior paint of a used automobile available for resale as set forth in claim 12, wherein said wireless enabled paint thickness gauge is Bluetooth enabled; and
    the step of storing the data point readings utilizes Bluetooth technology.

14. The method of determining the diminished value of the exterior paint of a used automobile available for resale as set forth in claim 13, wherein said data collection device is a personal digital assistant (PDA).

15. The method of determining the diminished value of the exterior paint of a used automobile available for resale as set forth in claim 13, wherein said data collection device is a personal computer (PC).

16. The method of determining the diminished value of the exterior paint of a used automobile available for resale as set forth in claim 13, wherein said data collection device utilizes a personal digital assistant and a personal computer (PC).

17. The method of determining the diminished value of the exterior paint of a used automobile available for resale as set forth in claim 11, wherein the calculations are performed manually.

18. The method of determining the diminished value of the exterior paint of a used automobile available for resale as set forth in claim 11, wherein the calculations are performed automatically using a computer software program.

* * * * *